United States Patent Office 3,431,016
Patented Mar. 4, 1969

3,431,016
METHOD OF REDUCING THE PROFILE
OF A VEHICLE
Just Henrik Mundt-Petersen and Karl Åke Eriksson,
Landskrona, Sweden, assignors to Aktiebolaget
Landsverk, Landskrona, Sweden
Filed Jan. 3, 1967, Ser. No. 607,023
Claims priority, application Sweden, Dec. 7, 1966,
208/66
U.S. Cl. 296—28                 8 Claims
Int. Cl. B60p 9/00; B60r 27/00; B60s 11/00

ABSTRACT OF THE DISCLOSURE

A vehicle having an operator control cab which is hinged on one of its outer walls to a portion of the vehicle body to enable the cab to be swung about the hinge axis into an inclined position to reduce its effective vertical height at a certain point on the vehicle for clearance purposes during transportation. Preferably the hinge axis lies in a horizontal plane located between the midpoint and base of the cab.

---

This invention relates to a method of reducing the profile of vehicles in a plane extending through the cab of the vehicle and at right angles to the longitudinal direction thereof to permit transport of the vehicle on a railway car or other transport means.

As is well known, for the transport of goods by rail it is stipulated that the railway car and the goods thereon shall pass through a loading frame defining the permissible loading gauge.

The necessity of observing this stipulation often involves difficult problems in transporting by rail big vehicles which can be placed in one way only on the railway car, viz. longitudinally thereof.

There may be mentioned by way of example such wheeled and track-laying machines that because of their size and slow propulsion have to be transported by rail from the manufacturer to the buyer or to remote job locations.

In such machines the driver's cab generally is the part of the vehicle that can be accommodated only with the greatest difficulty within the confines of the permissible loading gauge. As a rule, the most serious problem is that the high and broad cabs of these vehicles cannot be accommodated in the tapering upper part of the loading gauge. To reduce the profile of the vehicle one has mostly resorted to the solution of making the driver's cab divisible in a horizontal plane so that the upper part of the cab can be lifted off. This solution, however, is unsuitable from structural points of view and is impractical since lifting implements are required to handle the removable cab part.

The invention has for its object to solve the problem of reducing the profile of the vehicle in a practical and simple way without necessitating dismounting any part of the cab and utilizing lifting implements to bring about this.

For realizing the above object the method suggested according to the invention is primarily characterised in that the driver's cab or at least the major portion thereof is made tiltable about a hinge connected to the remainder of the vehicle, and for reduction of said profile the cab or the major portion thereof is swung into such an inclined position that the cab is entirely within the confines of the loading gauge permissible for the transport means.

In a preferred method the cab is connected to the vehicle by means of a hinge arrangement, so placed that the cab can be swung in the manner of a two-armed lever about a support laterally of the cab and at a level between the base of the cab and the midheight thereof. Cables and connections for the controls and instruments in the cab to the various parts of the vehicle are made flexible in the area between the cab and the vehicle to permit swinging of the cab without the use of detachable couplings. Said cables and connections are preferably disposed in the area between the cab and the vehicle close to the pivot axis of the cab so that the requisite movement of them at the tilting of the cab is reduced to a minimum.

It is preferred in certain self-propelling machines to place the cab at the front end of the vehicle in an unsymmetrical position to the longitudinal axis of the vehicle and offset to one side thereof. With such a location of the cab the pivot pin of the hinge is placed preferably parallel to the longitudinal axis of the vehicle at that cab wall which borders on the other side of the vehicle to permit swinging of the cab from the normal operative position thereof at right angles to the longitudinal axis of the vehicle into a transport position in which the cab is so inclined that the outer wall thereof will come to lie inside the permissible loading gauge, with both its lowermost and uppermost point.

For practising the above described method the invention also relates to a vehicle equipped with a cab that, when the vehicle is placed on the railway car or other transport means longitudinally thereof, reaches with its upper part beyond the loading gauge permissible for the transport means. According to the invention this vehicle is characterised in that the cab is connected to the vehicle by detachable fastening means and with the aid of a preferably detachable hinge arrangement about which the cab after release of the fastening means can be swung preferably inwardly towards the vehicle from an operative position into an inclined transport position in which the cab is entirely within the permissible loading gauge when the vehicle is carried by said transport means.

In a preferred embodiment the hinge arrangement constitutes a hinge connection between the cab and a supporting device connected to the vehicle and located on the outer side of a cab wall bordering on the vehicle, and the pivot pin is placed in a horizontal plane at a level between the mid-height and base of the cab, the cab being tiltable about the supporting device into its inclined transport position after release of said detachable fastening means.

In a vehicle having the cab located at the front and at one side of the vehicle in an unsymmetrical position relative to the longitudinal axis of the vehicle the cab is connected to the supporting device on the vehicle by means of a hinge arrangement at the wall bordering on the other side of the vehicle so that the cab can be swung transversely of the vehicle to the inclined transport position.

The hinge pin may be positioned at the base of the vehicle but is preferably located at a higher level spaced above the base of the cab. Said location facilitates the provision of a free space in the vehicle to permit the requisite swinging of the cab. The position of the pivot pin is so selected that the condition of a reduction of the profile of the vehicle to the permissable loading gauge is satisfied, which implies that the pivot pin must not be placed in such a way that the transverse profile of the vehicle is increased beyond the permissible loading gauge though the height profile of the vehicle is reduced.

These and further features of the invention will be described more in detail in the following with reference to the accompanying drawings in which.

Figure 1:
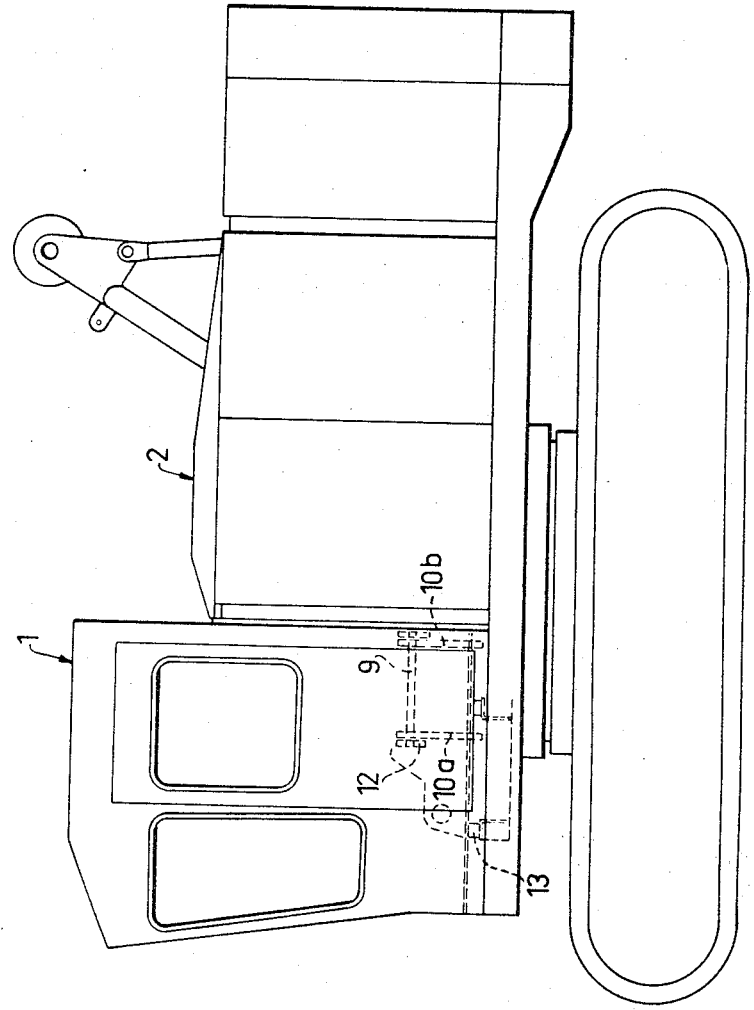
FIG. 1 is a side elevation of a track-laying machine having a cab constructed in conformity with the invention, a portion of the outer side wall of the cab being broken away to show the hinge connection of the cab to a supporting device on the machine.

The track-laying machine or vehicle shown in FIG. 1, more particularly an excavator, is equipped with a driver's cab 1 which is disposed at the front of vehicle 2 laterally of the longitudinal axis thereof. In a normal operative position the cab will give the vehicle a profile, as viewed in a vertical plane through the cab at right angles to the longitudinal axis of the vehicle, that is too large to permit transport of the vehicle by rail.

Figure 2:
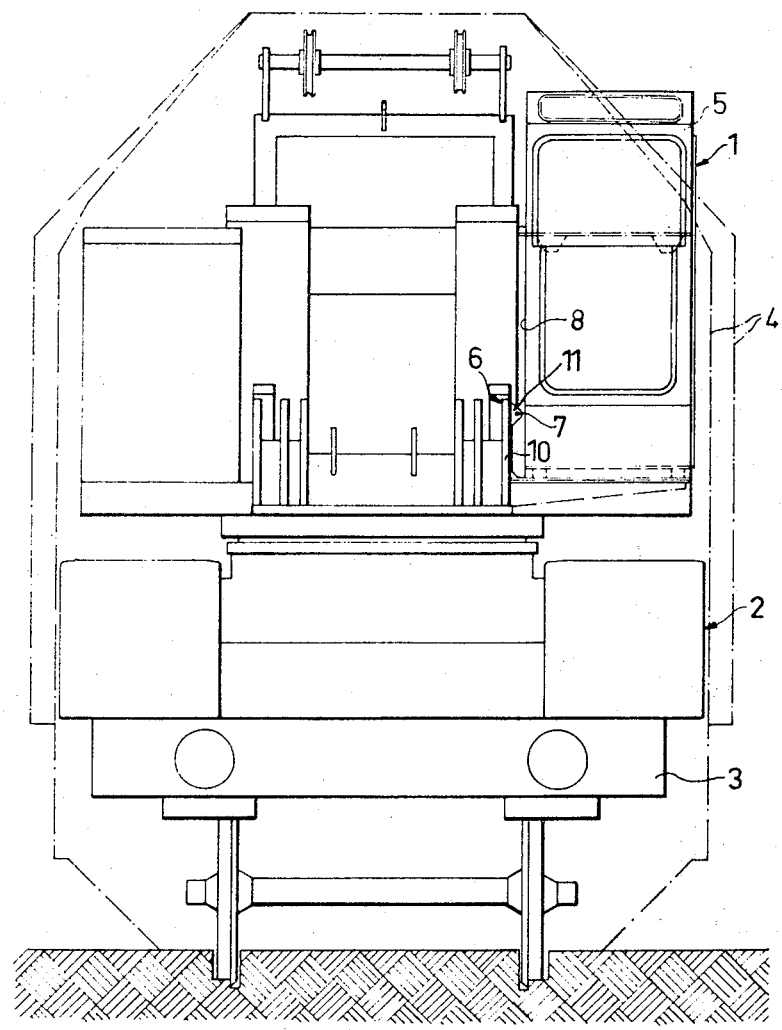
FIG. 2 is a front view of a railway car and the machine in FIG. 1 carried thereon for transport by rail.

In FIG. 2 where the vehicle 2 is placed for transport by rail on a railway car 3 a couple of loading gauges generally applied for railway transport are indicated by dash lines 4 to show the relation between the vehicle profile and the permissible loading gauge, and as will appear from FIG. 2 the cab 1 extends with its upper outer corner portion 5 in a vertical and horizontal direction beyond the loading gauges 4 at the upper tapering portions thereof.

Figure 3:
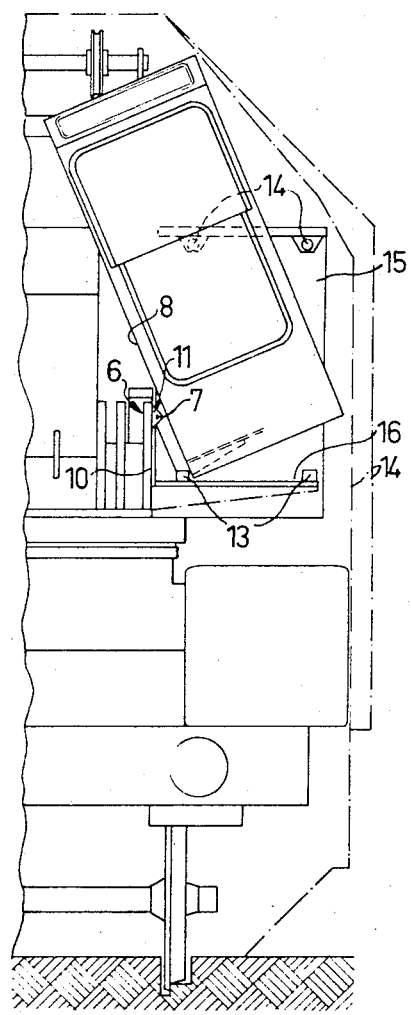
FIG. 3 is a view corresponding to the right-hand portion of FIG. 2, but showing the cab of the machine swung inwardly transversely of the machine to a transport position.

According to the invention, for reducing the profile of the vehicle 2 in a vertical plane at right angles to the longitudinal direction of the vehicle, the cab 1 is, however, mounted in the vehicle by means of a hinge arrangement generally designated 6 in such a way as to permit swinging the cab about a pivot pin 7 parallel to the longitudinal axis of the vehicle and located at the outer side of the cab wall 8 facing the longitudinal axis of the vehicle. From the operative position shown in FIGS. 1 and 2 the cab can thus be swung to an inclined transport position in which the cab will come to lie entirely within the confines of the permissible loading gauge. This transport position is shown in FIG. 3 where the permissible loading gauges 4, like in FIG. 2, are indicated by dash lines.

With regard to the possibilities of reducing the profile of the vehicle 2 in the plane indicated the most favourable position of the pivot pin 7 will be at the lower edge of the inner side wall of the cab, provided that it is not desired to allow the floor plane of the cab 1 to be lowered at the swinging movement thereof. A prerequisite for such a low location of the pivot axis is that there is a relatively large free space laterally of the cab to permit the cab to be swung inwardly and also that said free space extends down to a plane at a level with the bottom plane of the cab. However, mostly there are but limited possibilities of providing such a free space in the vehicle, but this problem may be simplified considerablly by elevating the pivot pin 7 some distance from the bottom plane of the cab. As will best be seen from FIG. 3 the pivot pin 7 is placed at a height which is calculated with due consideration of the fact that the highest and lowest point of the outer side of the cab, after the latter has been sung to transport position, shall come to lie within the permissible loading gauge and also with due consideration of the fact that the cab shall go free of upstanding parts of the vehicle adjacent to the inner side wall of the cab. Therefore the height level for the location of the pivot pin 7 is chosen with due attention to these two factors so that the choice in any case ensures that the cab in the inwardly swung transport position thereof will be within the confines of the permissible loading gauge.

With regard to all of the above mentioned factors and the dimensions of the cab it has proved suitable in the vehicle illustrated to dispose the pivot pin 7 at a level situated approximately at one-fifth of the total cab height counted from the bottom plane of the cab, and generally it will be most suitable to place the pivot axis at one of the cab side walls facing inwardly of the vehicle at a level between the mid-height of the cab and the bottom plane thereof.

In the embodiment illustrated the hinge arrangement 6 for the tiltable cab 1 is constituted by a hinge pin 9 which connects to the inner cab side wall 8 a supporting device 10 mounted on the vehicle inside said inner cab side wall. The supporting device 10 comprises a pair of posts 10a, 10b (FIG. 1) which have their upper ends provided with bearing lugs 11 situated laterally of and coaxially with regard to similar bearing lugs 12 secured to the outer side of the inner cab side wall 8. The hinge pin 9 may be detachably mounted in said bearing lugs 10, 11, so as to be readily withdrawable when the cab is swung to its normal operative position, and again readily insertable in the bearing lugs when the cab is to be swung to transport position. Of course, use may be made of a pair of journals in lieu of a through hinge pin 9.

In the normal operative position the cab 1 rests on spring elements in the shape of rubber blocks 13 arranged on the cab supporting vehicle subframe, and is connected to the vehicle by releasable fastening means (not shown) at the bottom plane opposite the rubber blocks 13. Besides, at points approximately at cab mid-height the cab is resiliently connected by fixation means 14 to the upper corners of a rectangular supporting arm 15 laterally of the inner cab side wall (see (FIG. 3). When the cab is locked to the vehicle with the aid of these resilient releasable fastening means the hinge connection between the cab and the vehicle can be released by withdrawal of the hinge pin 9 or corresponding journals so that the hinge arrangement does not prevent the spring movements of cab on the rubber blocks 13 and in the spring fastenings 14.

It may be suitable in certain cases to use a permanent hinge connection between the cab and the vehicle, in lieu of the described releasable hinge arrangement 6. This is easily realized by connecting the hinge pin 9 either to the bearing lugs 11 of the posts 10a, 10b or to the corresponding bearing lugs 12 on the cab. It may be suitable in that case to make also the hinge 6 resilient to permit spring movements of the cab in the normal operative position thereof.

In the inwardly swung position shown in FIG. 3 the cab is retained on one hand by the hinge arrangement 6 and on the other hand by a readily releasable locking device (not shown), e.g., a stretching screw or a lock bolt which can be passed through a fastening (e.g., at 14) on the upper part of the cab and a corresponding fastening on the vehicle and can be locked to these fastenings with the aid of a wing nut.

All controls and cables (not shown) leading from the cab are flexibly disposed between the cab and the remaining vehicle to permit the requisite cab tilting movement. With a suitable location between the cab and the vehicle adjacent the pivot pin 7 of the cab, said controls and cables need not take up either large bending moments or changes in length.

In the arrangement described above the cab is swingable in the manner of a two-armed lever about a support point represented by the supporting device 10, the weight distribution between the "lever arms" being adapted by way of their relative lengths so that the cab can be tilted manually to transport position and returned to operative position without mechanical aid and without necessitating release of cables or other connections to realize the swinging movement.

In FIG. 3 where the cab is shown in its inwardly swung transport position the angle of inclination of the cab is somewhat less than 30°, which is sufficient here to allow the upper front edge of the cab to be within the permissible loading gauge. In other cases the angle of inclination may naturally be greater or smaller depending upon the cab dimensions, the available free space on the vehicle for swinging the cab the choice of pivot point etc. As has been indicated in the foregoing, the choice of pivot point is also dependent upon the weight distribution in the cab and the desideratum that swinging of the cab shall be possible with as low efforts as possible, and moreover both the angle of inclination and the choice of pivot point, of course, are dependent upon the type of cab and vehicle and also dependent upon whether the cab is to be swung parallel with the longitudinal axis of the vehicle, or, as shown, transversely of the vehicle.

FIG. 3 also illustrates the main principles of a cab 1 that can be tilted rearwardly to a transport position, in lieu of laterally, assuming that this figure shows the vehicle 2 in side view instead of in front view. In the last mentioned case the problem is simplified when the position of the front lower edge of the cab need not be taken into consideration after the cab has been swung rearwardly.

What we claim and desire to secure by Letters Patent is:

1. In combination with a vehicle including a body, means for supporting the body for movement over a surface, and an operator's control cab mounted on the body; hinge means on said cab and body mounting said cab for swinging movement relative to the body about a non-vertical axis between a normal generally upright position and an inclined position so as to reduce the effective height of the cab above a certain point on the vehicle to permit passage of the vehicle through a relatively narrow passage during transportation, and means for releasably securing said cab to said body in said inclined position, said axis being in a horizontal plane located between the base of the cab and a mid elevation point of the cab.

2. The combination defined in claim 1 wherein said cab includes an outer side wall portion and said body includes a vertical portion adjacent said cab side wall portion, and wherein said hinge means is mounted on said cab side wall portion and said adjacent vertical portion of said vehicle body.

3. The combination defined in claim 2 wherein said horizontal hinge axis extends longitudinally of the vehicle and the cab is constructed to move as a one piece unit such that the cab is pivotable about said axis in a vertical plane transversely of the vehicle with the upper portion of the cab moving inwardly of the vehicle and the lower portion of the cab moving outwardly of the vehicle.

4. A vehicle comprising in combination; a body having a support device, a cab placed at the front and on one side of the vehicle body in an asymmetrical position relative to the longitudinal axis of the vehicle, said cab including opposite external side walls, hinge means on said support device and one of said cab side walls remote from said one side of the vehicle for mounting the cab for swinging movement between a normal upright position and an inclined transport position with the upper portion of the cab displaced inwardly and the lower portion of the cab displaced outwardly from the normal upright position, said hinge means including a hinge pin extending longitudinally of the vehicle in a horizontal plane so that the cab is pivotable about said pin in a vertical plane at right angles to the longitudinal axis of the vehicle into the inclined transport position, said hinge pin being further located at a level between the base of the cab and the mid-height of the cab.

5. The vehicle defined in claim 4 further including securing means for releasably securing the cab to the vehicle body in the normal upright position of the cab.

6. A vehicle as claimed in claim 5, wherein the hinge means between the cab and the vehicle is resilient.

7. A vehicle as claimed in claim 6, which includes cables and controls leading from the cab to the vehicle, said cables and controls being flexibly arranged in the area between the cab and the vehicle.

8. A vehicle as claimed in claim 7, wherein the flexible cables and controls in the area between the cab and the vehicle are concentrated to a region in immediate proximity to the hinge pin.

References Cited

UNITED STATES PATENTS

| | | |
|---|---|---|
| 2,503,181 | 4/1950 | Wagner. |
| 2,931,155 | 4/1960 | Anderson et al. _____ 56—25 |
| 3,088,537 | 5/1963 | LeTourneau. |
| 3,163,128 | 12/1964 | Enochian _____ 105—368 |

LEO FRIAGLIA, *Primary Examiner.*

JOHN A. PEKAR, *Assistant Examiner.*

UNITED STATES PATENT OFFICE
CERTIFICATE OF CORRECTION

Patent No. 3,431,016                      March 4, 1969

Just Henrik Mundt-Petersen et al.

It is certified that error appears in the above identified patent and that said Letters Patent are hereby corrected as shown below:

In the heading to the printed specification, line 8, "Dec. 7, 1966" should read -- Jan. 7, 1966 --.

Signed and sealed this 7th day of April 1970.

(SEAL)
Attest:

Edward M. Fletcher, Jr.              WILLIAM E. SCHUYLER, JR.
Attesting Officer                       Commissioner of Patents